June 14, 1927.
P. MATTHIESSEN ET AL
1,632,491
FLOATING DRY DOCK
Filed May 12, 1926
4 Sheets-Sheet 1
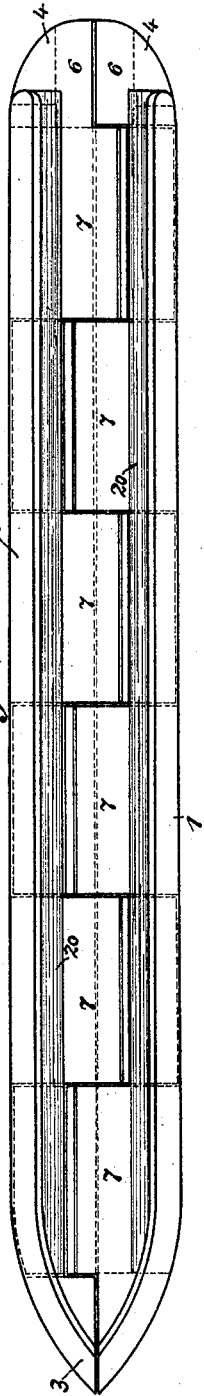
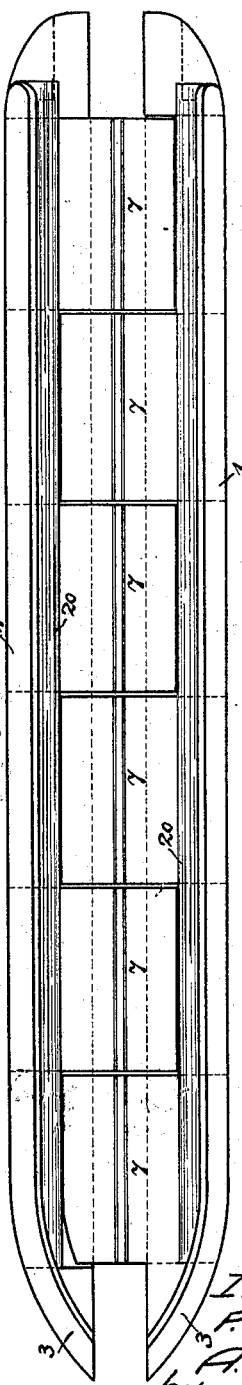
Inventors
P. Matthiessen
A. D. Möller June 14, 1927.
P. MATTHIESSEN ET AL
1,632,491
FLOATING DRY DOCK
Filed May 12, 1926
4 Sheets-Sheet 2
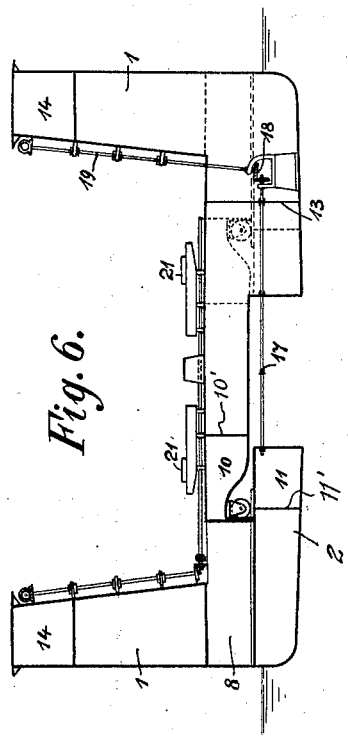
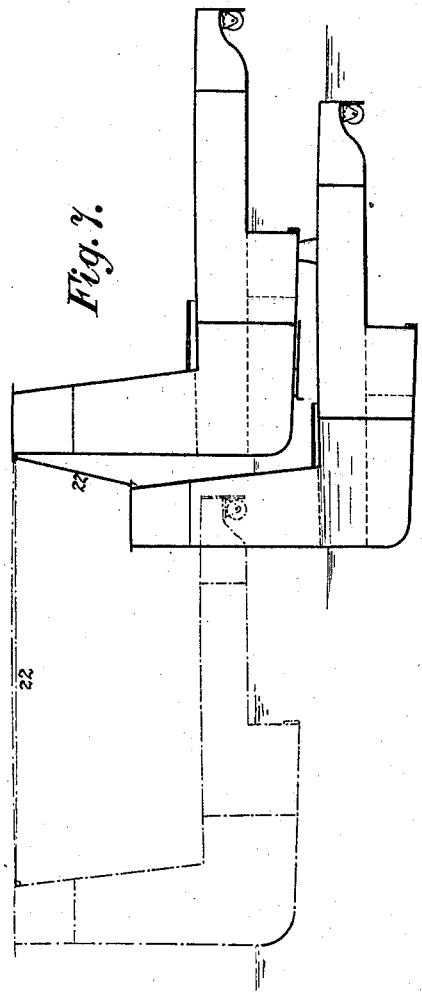
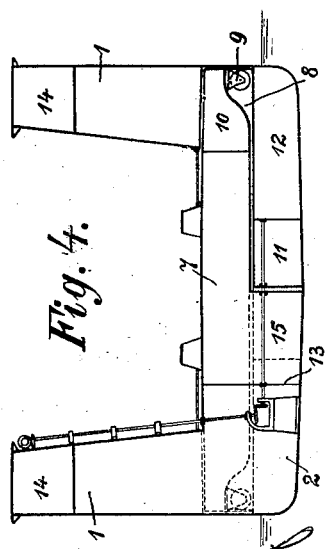
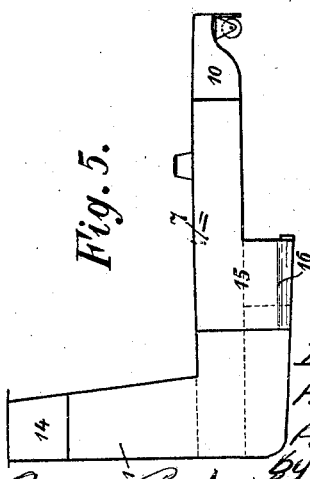
Inventors
P. Matthiessen
A. D. Möller
by
Langner Parry Card & Langner Attys

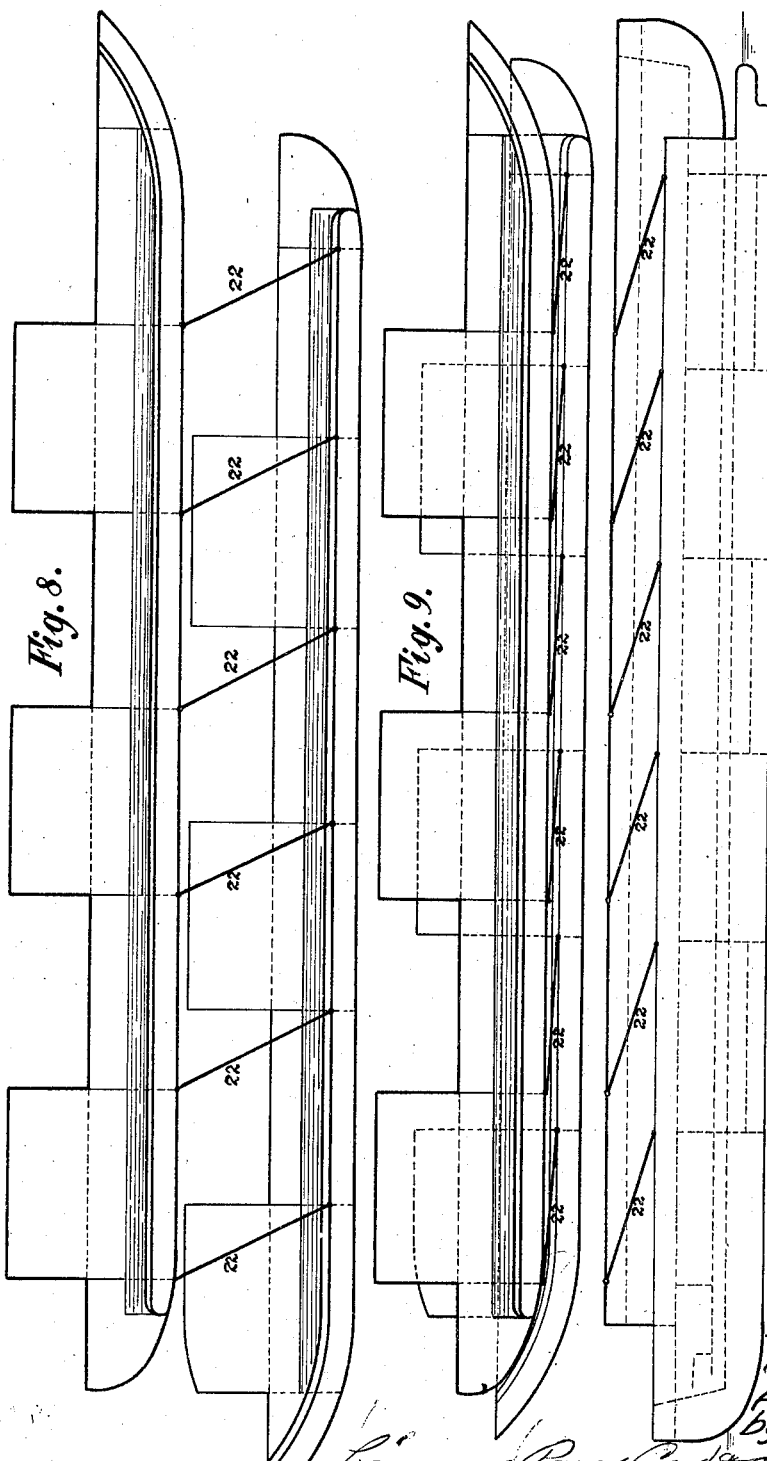

INVENTOR
P. Matthiessen and
A. D. Moller
by Langmur, Parry, Lord Langmur Att'ys.

Patented June 14, 1927.

1,632,491

UNITED STATES PATENT OFFICE.

PAUL MATTHIESSEN AND ADOLF DETLEF MÖLLER, OF HAMBURG, GERMANY.

FLOATING DRY DOCK.

Application filed May 12, 1926, Serial No. 108,627, and in Germany May 18, 1925.

This invention refers to a floating dry dock. The dock is composed of a longitudinal buoyant box-like sectional bottom and of longitudinal buoyant box-like sides, the two sections or halves of the bottom being formed like a comb engage one another. Each of the two sections together with one box-like side is buoyant for itself and can float independently from one another, and when they are brought together they interlock with one another. When shifted together they form a complete hull and when separated are adapted to alternatively dock themselves.

Reference is taken to the accompanying drawings, in which the construction is shown by way of example.

Fig. 1 is an elevation of the dry dock constructed according to the present invention.

The Figs. 2 and 3 are plans of the dry dock in two different positions.

Figs. 4 and 6 are cross-sections of the dry dock to a larger scale in two different positions.

Fig. 5 is a cross-section of one of the buoyant sections or halves of the dry dock.

Fig. 7 is a section of two dock-halves in a position, in which one section is docked by the other, the initial position of the acting dock being shown in broken lines.

The Figs. 8 and 9 are plans of the two sections or halves of the dry dock in two different positions.

Figure 11:
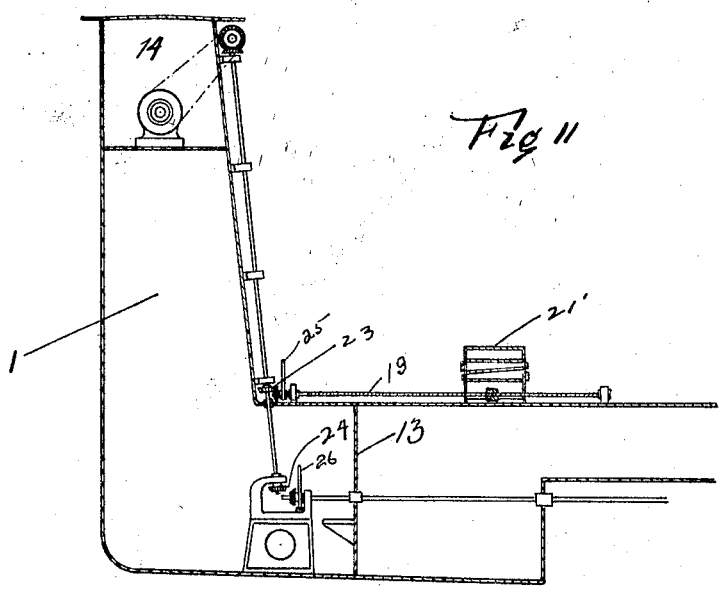
Figure 12:
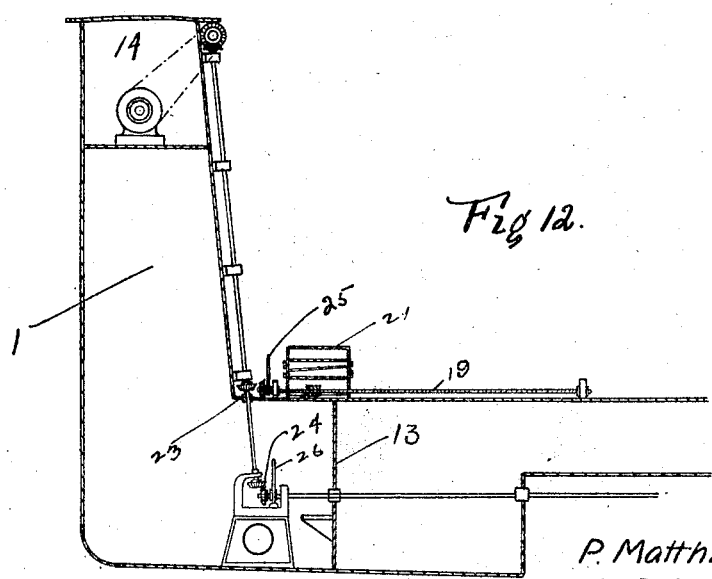

Fig. 10 is an elevation of the dry dock, in which one section is docked by the other, and Figures 11 and 12 are sectional views showing the mechanism for operating the bilge blocks and for separating the dock sections, Figure 11 showing the bilge block mechanism in operative position and Figure 12 the dock separating mechanism operatively connected, each to the exclusion of the other.

The walls of the box-like sides 1 and of the box-like bottom 2 extend throughout the complete length of the dry dock. The box-like bottom is divided in the center plane of the dry dock into two sections or halves, and the front parts 3 of the two sectional bottom halves are so turned upwards to constitute together with the sides 1 a stem. The rear parts 4 of the bottom supplement themselves to a stern, and are each provided with a propeller 5 and chambers 6 for accommodating the driving motors of the propellers.

The two halves of the box-like bottom engage one another by arms or fingers 7, which alternatively extend in one and the other direction. The fingers 7 of one bottom section project into correspondingly shaped recesses 8 of the other bottom section. Rollers or wheels 9 are preferably mounted rotatably on the fingers and run on rails. They may be anchored to these rails by tongues or pliers or in any other convenient manner, and by these means the two halves or sections of the dry dock may be operated to approach one another or to move away from one another in transverse direction and can be locked in any desired position. When the two sections are closed upon one another, the fingers 7 of each section project under the box-like side 1 of the other section.

Each half or section of the dry dock is buoyant independently, as may be gathered from Fig. 5. At the outer ends of the fingers 7 air chambers 10 and at the innermost side of the bottom sections below the level of the recesses 8 air chambers 11 are provided separated from the rest of the space between the walls of the dock respectively by partitions 10' and 11' shown in Figure 6. The chambers 12, which serve as water tanks and which are situated next to the air chambers 11 and below the recesses 8 are divided by transversal partitions or bulkheads. That part 15 of each bottom half or section into which the recesses do not extend is divided by a longitudinal partition or bulkhead 13 into two chambers. The side boxes 1 may be provided with air chambers 14 on top in known manner. When the dry dock is fully drawn asunder each dry dock section is buoyant for itself, when the inner chambers formed by the longitudinal bulkheads of the not recessed part of the bottom are flooded, up to about the level 16, Fig. 5.

The means for drawing the two sections asunder may consist of a right- and left-hand screw spindle, which is journaled in or by water-tight bearings passing through the innermost walls of the lower part of the box-like bottom respectively, and which is operatively connected with the spindle 19 for operating the bilge block 21. During the operation of the bilge blocks the dock itself is in an expanded position, the shafts for operating the dock sections being thrown out of gear as may be gathered from Figure 11 of the drawings, in which the bevel gear set 24 is shown thrown out of engagement by means of the clutch lever 26. The operation is different when the sections of the dock are brought together as may be understood from the position of the parts in Figure 12 in which the gear set 23 of the bilge block drive is shown as inoperative, the parts of the gear set being separated by means of the clutch lever 25. When the sections of the dry dock are drawn asunder without being fully separated Fig. 6, the free openings of the recesses 8 at the ends of the arms 7 will be closed by platforms 20 which are pivoted to the sides 1.

The operation of the selfdocking is as follows: The section to be docked will first be turned round to 180° and anchored. Thereupon, as is seen in Fig. 8, the section is connected by rods 22, pivoted to the outer upper edge of the section to be docked in this way that the rods are linked to or rotatably connected with the inner upper edge of the side of the other section. The last named section or half-dock is then caused to sink, whereby the rods 22 guide it in such manner, that it moves under the section to be docked, Figs. 7 and 8.

The docking section will then be emptied by pumps to such an extent that the section to be docked is raised out of the water.

We claim:—

1. A floating dry dock having longitudinal box-like sides and a similar bottom, the box-like bottom being divided at the longitudinal center plane to form two independently buoyant sections, characterized by this that each section is provided with fingers and between the fingers with recesses in the upper part of the box-like bottom, the fingers of one section being adapted to enter the recesses of the other section, so that the two sections engage one another like two combs at a certain height above the floor of the box-like bottom.

2. A floating dry dock according to claim 1, characterized by this that the fingers of one section of the dry dock are constructed to project under the sides of the other section, and are provided with rollers adapted to run on rails arranged on the other section of the dry dock.

3. A floating dry dock according to claim 1, characterized by this that platforms are pivoted to the inner walls of the sides and adapted to cover open spaces of the recesses when the two sections are drawn asunder.

4. A floating dry dock according to claim 1, characterized by having bilge blocks, and operating gear therefor, screw spindles constructed to move the two sections away from one another or towards one another and operatively connected with the gear for operating the bilge blocks.

5. A floating dry dock according to claim 1 characterized by this that those portions of the bottom sections, which are situated at the ends of the fingers and those which are situated below the recesses are disconnected as to space from the rest of the bottom by partitions to form air spaces, the non-recessed portions of the bottom being divided into two chambers by a longitudinal bulkhead.

6. A floating dry dock according to claim 1, characterized by this that the two sections of the dry dock when closed upon one another to full extent constitute a hull.

7. A floating dry dock according to claim 1, characterized by this that the two sections of the dry dock when closed upon one another to full extent constitute a hull, the front portion of the bottom being turned up to form the stem and the rear portion of the bottom forming the stern.

In testimony whereof we have signed our names to this specification.

PAUL MATTHIESSEN.
ADOLF DETLEF MÖLLER.